Oct. 25, 1932.   H. F. PITCAIRN   1,884,848
AIRCRAFT DEVICE
Original Filed Dec. 12, 1925
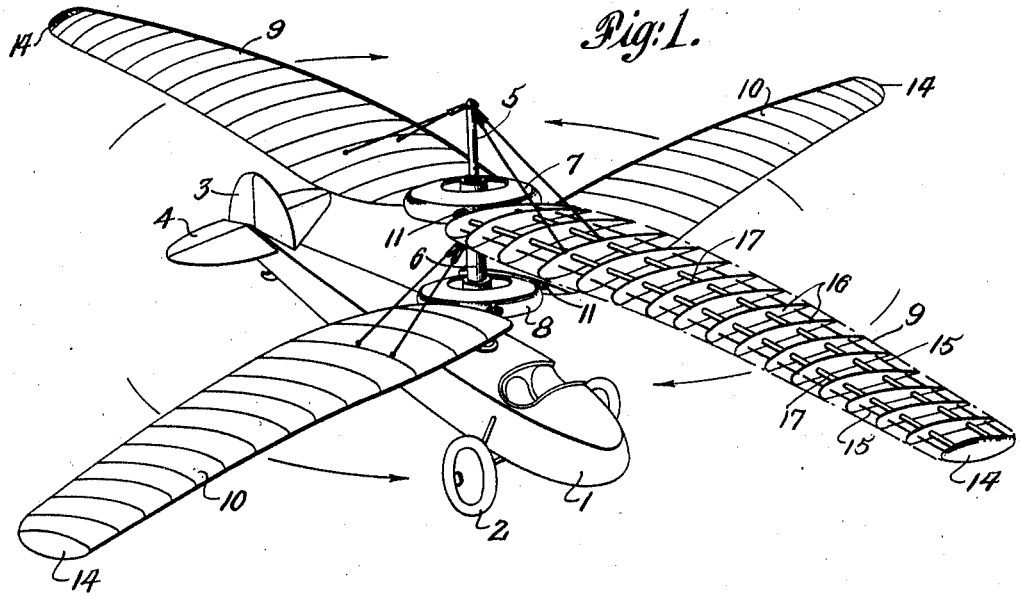
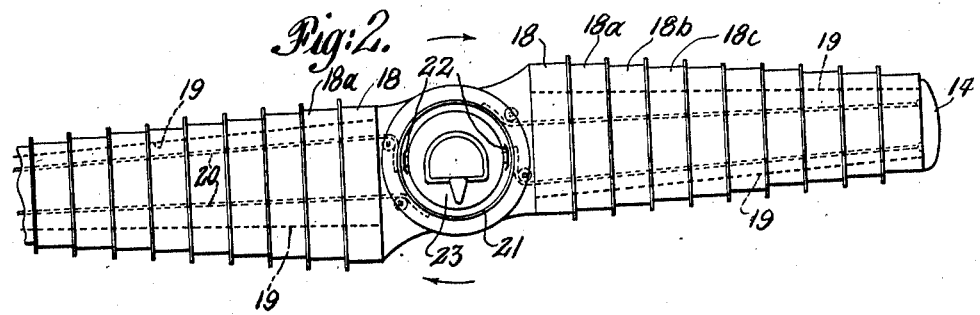
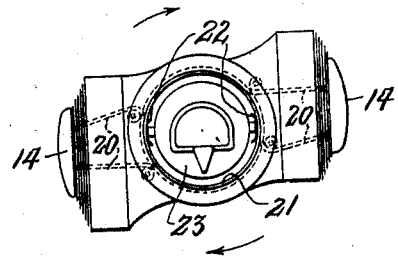
INVENTOR
Harold F. Pitcairn
BY
Synnestvedt & Lechner
ATTORNEYS Patented Oct. 25, 1932

1,884,848

UNITED STATES PATENT OFFICE

HAROLD F. PITCAIRN, OF BRYN ATHYN, PENNSYLVANIA, ASSIGNOR TO AUTOGIRO COMPANY OF AMERICA, OF PHILADELPHIA, PENNSYLVANIA, A CORPORATION OF DELAWARE

AIRCRAFT DEVICE

Original application filed December 12, 1925, Serial No. 74,941. Divided and this application filed June 24, 1929. Serial No. 373,379.

This invention has reference to an improvement in aircraft devices, particularly such as have revolving wings or vanes driven by motive power or by other means such as the reaction of the air upon the wings, the longitudinal propelling force being otherwise supplied. The present application is a division of my co-pending application, Serial No. 74,941, filed December 12, 1925, for aircraft devices, issued June 25, 1929, as Patent No. 1,718,577.

One of the primary objects of this invention is the provision of a device of the character specified in which I have arranged the wing so that it will be flexible and will at the same time be capable of support in position for operation by means of centrifugal force of the rotation in conjunction with the action of the air against it or a power driving mechanism, which mechanism is preferably connected at or near the center of rotation.

A further object of the invention is the provision of an aircraft in which the several parts of which the wing is composed will be maintained in relative and operative position by centrifugal force.

A further object of my invention is the provision of means for taking care of the wing parts when centrifugal force is not operative as is the case when the rotative motion comes to an end.

More specifically I aim to provide a rotative wing structure or sustaining unit, including a plurality of blades capable of maintaining their proper operative shape when rotating, although built of several flexibly related parts, with the several wing parts arranged to telescope one within another, or otherwise fold or collapse when not in use, to facilitate moving, handling and storing of the aircraft and minimize danger of injury or damage to the wings.

Still another object of the invention is to aid or effect the folding or telescoping of the wing structure by means of its own rotation, as by the employment of a drum, wing-retracting cables which may be wound thereon, and brake shoes for controlling the same.

In order that my improvement will be better understood, I will proceed to describe the same in connection with the accompanying drawing in which I have illustrated it in preferred form and in which Fig. 1 is a perspective view of a machine to which my improvements are particularly applicable;

Fig. 2 is a top plan view (partly broken away) of my improved wing or vane, and associated structure, showing the several wing parts arranged to telescope one within the other; and Fig. 3 is a plan view showing the telescopic parts drawn into retracted position.

Referring now more particularly to Fig. 1 it will be seen that I have therein indicated at 1 the fuselage of an airplane device provided with wheels 2 and a vertical rudder 3 and horizontal elevator 4.

Extending upwardly from the fuselage 1, I provide an arrangement of driving shafts, one of which, 5, projects upward thru another one 6, which latter is tubular in form. Attached to the shaft 5 is a hub 7 for driving a pair of wings 9 while attached to the shaft 6 is a hub 8 arranged to drive another pair of wings 10 in an opposite direction.

The wings may be pivotally carried by the hubs as indicated at 11 or if preferred may be rigidly secured to the hubs as I provide them with a certain degree of flexibility giving them a movement or flexure longitudinally, the parts being held in operative position during rotation by means of the centrifugal force which is augmented by the weight 14 placed at the tip of the wing and secured by the retaining cord 15 which in the illustrative structure shown in Fig. 1 passes thru the ribs 16, there being a somewhat flexible additional support provided in the arrangement by the use of rods 17 which may be of bamboo or flexible steel tubing, the purpose of these rods being in this arrangement to keep the tips of the wings from sagging too much when they are not rotating.

In place of the flexible wing structure shown in Fig. 1, I may mount on the hub a collapsible or telescopic wing structure, which may similarly be flexible, to compensate for variations in lift and centrifugal force, such as shown in Figs. 2 and 3.

In the latter figures I have shown a flexible wing composed of a plurality of telescopically disposed parts 18, 18a, 18b, 18c, etc., these being held by the cords 19 in operative position as shown in Fig. 2 when the weights 14 are pulling outward by the action of centrifugal force. The arrangement shown in these figures is provided with retraction cords 20, constructed to be wound around a drum 21 when the latter is caused to stop rotating by setting out the shoes 22 which exert frictional resistance such as will utilize the momentum of the revolving motion of the wing parts in wrapping the cords 20 around the drum, as the result of which, the wings, when the machine comes to rest, are drawn into the position shown in Figure 3. The part 23 is stationary, the other parts revolving around it, and the drum 21, when its rotation is stopped, acts to wind up the cords 20 only when the shoes 22 are thrown into action.

It will be observed that the forces exerted by the air will cause the parts to flex with relation to each other, the weight acting thru centrifugal action to hold the assembled units in operative position.

While I have shown a device in which two oppositely rotating superposed pairs of wings are employed, it should be understood that the device is equally applicable to aircraft employing but one or a number of sustaining units, and to a unit which may have more than two blades or wings.

I claim:—

1. In an aircraft, a rotatively mounted hub member, a wing mounted thereon and formed of collapsible aerofoil sections flexibly joined together and adapted to be held in operative form by the centrifugal force of rotative movement.

2. A rotatively mounted collapsible wing for aircraft, which is held in operative form by the centrifugal force of its rotative movement, together with means for collapsing the same when the wing is at rest.

3. A rotatively mounted collapsible wing for aircraft, which is held in operative position by the centrifugal force of its rotative movement, together with means utilizing its movement to collapse the wing.

4. A rotatively mounted collapsible wing for aircraft, which is held in operative position by the centrifugal force of its rotative movement, together with means utilizing its movement to collapse the wing, including wing-retracting cables and a drum on which said cables may be wound.

5. A rotatively mounted collapsible wing for aircraft, which is held in operative position by the centrifugal force of its rotative movement, together with means utilizing its movement to collapse the wing, including wing-retracting cables and a drum on which said cables may be wound, said drum being normally revoluble with the wing but having means for arresting its rotation.

6. In an aircraft device, a rotatably mounted wing or blade formed of air-surface sections with flexible joints between them for self-flexure of the wing under the influence of the air acting upon it.

7. In an aircraft device, a rotatably mounted wing telescopically jointed for flexure under the influence of the air acting upon it.

8. In an aircraft device, a rotatably mounted wing telescopically jointed for flexure under the influence of the air acting upon it, and means for telescoping the same as it comes to rest.

9. A rotatively mounted wing for aircraft, formed of a plurality of air-surface sections retractible to inoperative position and normally held extended by the centrifugal force of its movement.

10. A rotatively mounted retractible wing for aircraft normally held extended by the centrifugal force of its movement, together with means utilizing such movement to retract the same.

11. A telescopic wing structure having a weight tending to keep it in operative position, and means for telescoping the wing to inoperative position.

12. In an aircraft device, a rotatable axis member and a wing mounted thereon and formed of air-surface sections flexibly jointed together whereby deformation or flexure of the wing may be effected under the influence of the reaction of the air upon it.

13. In an aircraft, a rotatable axis member, and a plurality of rotative wing structures mounted on said member to rotate together, each wing structure comprising, independently of the others, a plurality of air-surface elements mounted to be movable with respect to said axis member, said elements of each wing being shaped to form, in co-operation with each other, a unified streamline or aerofoil-shaped wing structure when relatively positioned for normal operation.

14. In an aircraft, a rotatable axis member, and a plurality of rotative wing structures mounted on said member to rotate together, each wing structure comprising, independently of the others, a plurality of air-surface elements mounted to be movable with respect to each other, said elements of each wing being shaped to form, in co-operation with each other, a unified streamline or aerofoil-shaped wing structure when relatively positioned for normal operation.

15. In an aircraft, a rotatable axis member, and a plurality of rotative wing structures mounted on said member to rotate together, each wing structure comprising, independently of the others, a plurality of air-surface elements mounted to be movable with respect to said axis member, said elements of each wing being shaped to form, in co-operation with each other, a unified streamline or aerofoil-shaped wing structure when relatively positioned for normal operation, together with power means for rotating the wings.

16. In an aircraft, a rotatable axis member, and a plurality of rotative wing structures mounted on said member to rotate together, each wing structure comprising, independently of the others, a plurality of air-surface elements mounted to be movable with respect to each other, said elements of each wing being shaped to form, in co-operation with each other, a unified streamline or aerofoil-shaped wing structure when relatively positioned for normal operation, together with power means for rotating the wings.

17. In an aircraft, an upright axis member, and a rotative sustaining wing mounted thereon and formed of a series of individual box-like aerofoil sections jointed together in such manner as to secure them to the rotative axis as against the action of centrifugal force, said sectional wing being arranged to be maintained in operative position by the action of centrifugal force, as against the lifting reaction of the air.

18. In an aircraft, an upright axis member, and a rotative sustaining wing mounted thereon and formed of a series of individual box-like aerofoil sections with tension means extending lengthwise inside the series of sections.

19. In an aircraft, an upright axis member, and a rotative sustaining wing mounted thereon and formed of a series of individual telescopable box-like aerofoil sections having flanges extending generally transverse the plane of the wing at the points of juncture of the sections.

In testimony whereof I have hereunto signed my name.

HAROLD F. PITCAIRN.